United States Patent [19]

Hansen

[11] 4,141,876

[45] * Feb. 27, 1979

[54] ADHESIVE COMPOSITION CONTAINING A POLYPHENYLENE ETHER RESIN

[75] Inventor: David R. Hansen, Houston, Tex.

[73] Assignee: Shell Oil Company, Houston, Tex.

[*] Notice: The portion of the term of this patent subsequent to Aug. 1, 1995, has been disclaimed.

[21] Appl. No.: 836,102

[22] Filed: Sep. 23, 1977

[51] Int. Cl.$^2$ .................. C08L 45/00; C08L 53/00
[52] U.S. Cl. ...................... 260/33.6 UA; 260/829; 260/874; 260/876 B
[58] Field of Search .............. 260/33.6 UA, 874, 829, 260/876 B; 427/207 A

[56] References Cited

U.S. PATENT DOCUMENTS

| | | | |
|---|---|---|---|
| 3,239,478 | 3/1966 | Harlan | 260/879 |
| 3,361,851 | 1/1968 | Gowan | 260/897 |
| 3,379,792 | 4/1968 | Finholt | 260/857 |
| 3,383,435 | 5/1968 | Cizek | 260/874 |
| 3,639,508 | 2/1972 | Kambour | 260/876 B |
| 3,660,531 | 5/1972 | Lauchlan et al. | 260/876 B |
| 3,663,661 | 5/1972 | Katchman | 260/892 |
| 3,835,200 | 9/1974 | Lee | 260/876 B |
| 3,917,607 | 11/1975 | Crossland et al. | 260/27 BB |
| 3,952,072 | 4/1976 | Yonemitsu et al. | 260/874 |
| 3,994,856 | 11/1976 | Katchman et al. | 260/876 B |
| 4,104,323 | 8/1978 | Hansen | 260/829 |

Primary Examiner—Ronald W. Griffin
Attorney, Agent, or Firm—Dean F. Vance

[57] ABSTRACT

An adhesive composition having greatly improved high temperature properties is prepared by melt blending a polyphenylene ether resin, a selectively hydrogenated arene/conjugated diene block copolymer, tackifying resin, and optional hydrocarbon processing oil.

9 Claims, No Drawings

ADHESIVE COMPOSITION CONTAINING A POLYPHENYLENE ETHER RESIN

BACKGROUND OF THE INVENTION

Selectively hydrogenated styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. However, one of the serious limitations of these adhesive compositions is their relatively low service temperatures. Generally, the highest temperature at which these hydrogenated styrene-diene block copolymers retain useful properties and act like a vulcanized rubber is limited to the softening temperature ($T_g$) of the styrene end block. Depending upon the molecular weight of the end blocks and the load, these block copolymers can begin to significantly creep or flow at 130°–220° F. For a number of applications it would be very advantageous to have higher service temperatures. For example, these adhesives would be useful in paint shops if the masking tapes produced had a 225–250° F. service temperature.

One means to improve the service temperature of these styrene-diene block copolymers is to mechanically mix a resin with the block copolymer which will increase the softening temperature of the styrene end blocks. However, the resins now currently available for this purpose are limited to service temperature increases of only about 30° F. or less at 30 phr (parts per hundred rubber) loading.

One possible resin not previously disclosed for use in adhesive compositions is a polyphenylene ether resin. These polyphenylene ethers are well known and are described in numerous publications including Hay, U.S. Pat. Nos. 3,306,874 and 3,306,875, and Stamatoff, U.S. Pat. Nos. 3,257,357 and 3,257,358. These polymers are high performance engineering thermoplastics having high molecular weights and possessing relatively high melt viscosities and softening points — i.e., $T_g$ equals 210° C., $>10^4$ poise at 315° C. However, the relatively high melt viscosities and softening points are somewhat of a disadvantage in blending with the subject hydrogenated styrene-diene block copolymers.

SUMMARY OF THE INVENTION

The present invention encompasses an adhesive composition possessing high service temperature along with good oxidative stability. This adhesive composition is a hot melt adhesive composition, and comprises:

(a) 100 parts by weight of a block copolymer having at least two polymer end blocks A and at least one polymer mid block B, each block A being a monoalkenyl arene polymer block having an average molecular weight of between about 2,000 and about 50,000 and each block B being an elastomeric hydrogenated polymer block of a conjugated diene having an average molecular weight of between about 20,000 and about 300,000; said blocks A comprising 8–55% by weight of the block copolymer;

(b) about 50 to about 200 parts by weight of a tackifying resin compatible with block B;

(c) about 0 to about 200 parts by weight of a hydrocarbon extending oil; and (d) about 1 to about 100 parts by weight of a low molecular weight polyphenylene ether resin having a molecular weight ($M_{vis}$) of between about 6,000 and about 25,000.

Adhesive compositions prepared according to the present invention posses service temperatures significantly higher than the similar prior art adhesives not containing the polyphenylene ether resin or adhesives which contain high molecular weight polyphenylene ether resin. Contrary to the expected result, it has been found that the particular low molecular weight polyphenylene ether resin herein employed is much preferred over the commercially available high molecular weight resin. Since the higher molecular weight polyphenylene ether resin has a higher softening temperature than the corresponding lower molecular weight resin, one would expect that adhesive compositions containing the higher molecular weight resin would have higher service temperatures than would adhesive compositions containing the lower molecular weight resin. However, it has surprisingly been found that the opposite is true — the adhesives containing the lower molecular weight resin have the higher service temperature.

RELATIONSHIP TO OTHER APPLICATIONS

The present application is related to two commonly assigned, copending applications by the same inventor. These applications are entitled "Blend Containing A Polyphenylene Ether Resin" and "Adhesive Composition Containing A Pre-Blended Polyphenylene Ether Resin", and have Ser. Nos. of 788,186, now U.S. Pat. No. 4,104,323, issued Aug. 1, 1978, and 788,199, now abandoned, respectively.

DETAILED DESCRIPTION OF THE INVENTION

The block copolymers employed herein may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid-block B as defined above. Expressed another way, the invention contemplates (but is not limited to) the use of configurations such as A—B—B—A)$_n$ where n varies from 1 to 20, preferably from 1 to 3. Methods for the preparation of such polymers are known in the art. Particular reference will be made to the use of lithium-based catalysts and especially lithium-alkyls for the preparation of the precursor polymers (polymers before hydrogenation). U.S. Pat. No. 3,595,942 not only describes some of the polymers herein contemplated, but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be affected with multifunctional coupling agents such as dihalo-alkanes or -alkenes and divinyl benzene as well as certain polar compounds such as silicon halides, siloxanes, or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystryene-polyisoprene-polystyrene (SIS)
poly(alpha-methylstyrene)-polybutadienepoly(alpha-methylstyrene) ($\alpha$MS-B-$\alpha$MS)
poly(alpha-methylstyrene-polyisoprenepoly(alpha-methylstyrene) ($\alpha$MS-I-$\alpha$MS)

It will be understood that both blocks A and B may be either homopolymer or random copolymer blocks as long as each block predominates in at least one class of the monomers characterizing the blocks as defined hereinbefore. Thus, blocks A may comprise styrene/alpha-methylstyrene copolymer blocks or styrene/butadiene random copolymer blocks as long as the blocks individually predominate in monoalkenyl arenes. The term "monoalkenyl arene" will be taken to include styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene, copolymers of butadiene with isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of alternating ethylene and propylene (EP).

Hydrogenation of the precursor block copolymers is preferably effected by use of catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of aliphatic double bonds are hydrogenated and less than 5% of the aromatic double bonds are hydrogenated.

The average molecular weights of the individual blocks may vary within certain limits. In most instances, the monoalkenyl arene blocks will have number average molecular weights in the order of 2,000-50,000, preferably 9,000-35,000, while the conjugated diene blocks either before or after hydrogenation will have average molecular weights in the order of 20,000-300,000, preferably 25,000-150,000. These molecular weights are most accurately determined by tritium counting methods or osmotic pressure measurements. The proportion of the monoalkenyl arene blocks should be between about 8 and 55% by weight of the block copolymer, preferably between about 10 and 30% by weight.

The block copolymer by itself is not tacky or sticky. Therefore, it is necessary to add a tackifying resin that is compatible with the hydrogenated elastomeric conjugated diene block. A much preferred tackifying resin is a diene-olefin copolymer of piperylene and 2-methyl-2-butene having a softening point of about 95° C. This resin is available commercially from Goodyear Chemical Company under the tradename WINGTACK ® 95, and is prepared by the cationic polymerization of 60% piperylene, 10% isoprene, 5% cyclopentadiene, 15% 2-methyl butene and about 10% dimer. See South African Pat. No. 700,881. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C. Other tackifying resins which are also useful in the compositions of this invention include hydrogenated resins, esters of resin, polyterpenes, terpenephenol resins, and polymerized mixed olefins.

The amount of tackifying resin employed varies from about 50 to about 200 parts per hundred rubber (phr), preferably, between about 50 and about 150 phr.

The hydrocarbon rubber extending oil, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311. The amount of extending oil employed varies from about 0 to 200 phr, preferably from about 25 to about 150 phr.

An essential component of the present invention is the polyphenylene ether resin. These resins significantly improve the service temperature of the adhesive composition.

The polyphenylene ether resins are those having repeating structural units of the formula:

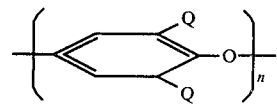

wherein the oxygen ether atom of one unit is connected to the benzene nucleus of the next adjoining unit, n is a positive integer, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the abovementioned patents of Hay and Stamatoff. Especially preferred polyphenylene ether resins for purposes of the present invention are those having alkyl substitutions in the two positions ortho to the oxygen ether atom — i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl). The molecular weight ($M_{vis}$) of the polyphenylene ether resin is between about 6,000 and about 25,000, preferably about 12,000. The softening point ($T_g$) of the ether resin is between about 170° C. and about 210° C., preferably less than about 200° C. The molecular weight ($M_{vis}$) of the polyphenylene ether is determined by intrinsic viscosity measurements in chloroform at 25° C. and is calculated using the equation $[\eta] = KM_{vis}^a$ where "$\eta$" is the limiting viscosity number and "K" and "a" are Mark Houwink constants equal to $4.83 \times 10^{-4}$ and 0.64 respectively. The molecular weight of the polyphenylene ether resin is critical.

The amount of polyphenylene ether resin employed is between about 1 and about 100 phr (parts by weight per hundred parts by weight rubber, or block copolymer as in this case), preferably between about 5 and about 50 phr.

Optionally, a high softening point-arene block compatible resin may be employed. Compatibility is judged by the method disclosed in U.S. Pat. No. 3,917,607. In addition to compatibility, the high softening point, resin should have a softening point above about 100° C., as determined by ASTM method E28, using a ring and ball apparatus. Useful resins include coumarone-indene resins, vinyl toluene-alphamethylstyrene copolymers, and polyindene resins. A preferred resin is a coumarone-indene. The amount of high softening point resin varies from about 10 to about 200 phr.

The adhesive compositions of the present invention are typically prepared by mixing the components at an elevated temperature, preferably between about 230° C. and about 260° C.

The adhesive compositions of this invention may be modified with supplementary materials including pigments, fillers, and the like as well as stabilizers and oxidation inhibitors.

The hot melt adhesives of the instant invention are preferably used in the preparation of pressure-sensitive adhesive tapes by a method such as that disclosed in U.S. Pat. No. 3,676,202. These tapes are preferably used where high service temperatures are required.

The invention is further illustrated by means of the following illustrative embodiments, which are given for the purpose of illustration alone and are not meant to limit the invention to the particular reactants and amounts disclosed.

In the embodiments and examples the following materials were employed:

(1) Block copolymer I; a selectively hydrogenated styrenebutadiene-styrene (SEBS) block copolymer having block molecular weights of about 10,000-55,000-10,000.

(2) Block copolymer II; a selectively hydrogenated styrenebutadiene-styrene (SEBS) block copolymer having block molecular weights of about 8,000-40,000-8,000.

(3) CUMAR LX-509; a coumarone-indene resin from Neville Chemical Company having a Ring & Ball softening temperature of about 155° C. and a glass transition temperature ($T_g$) determined by thermal expansion of about 88° C.

(4) PPO-L; pure poly (2,6 dimethylphenylene oxide) (PPO) produced by General Electric having a molecular weight ($M_{vis}$) of about 10,400 and a $T_g$ of about 195° C.

(5) PPO-H, pure poly (2,6 dimethylphenylene oxide) (PPO) produced by General Electric having a molecular weight ($M_v$) of about 50,000 and $T_g$ of 210° C.

(6) Wingtack 95; a diene-olefin tackifier resin from Goodyear Chemical Company.

(7) TUFFLO® 6056; a hydrocarbon rubber extending oil from ARCO.

(8) Kaydol; a paraffinic/naphthenic oil from Witco Chemical.

(9) ARKON P-85; a hydrogenated alphamethylstyrene resin from Arakawa Forest.

(10) Irganox 1010; an antioxidant from Ciba Geigy, covered by U.S. Pat. Nos. 3,285,855 and 3,644,482.

The adhesive compositions were evaluated by a modified Heat Distortion Temperature test (HDT), and a Shear Adhesion Failure Temperature test (SAFT).

The heat distortion temperature of the polymer blends was measured with die D tensile bars (ASTM D-412) cut from plaques 0.07 inches thick, compression molded at 1000 psi. A molding temperature of 160° C. was used. The samples were subjected to a 100 psi tensile load (engineering stress) in a temperature chamber in which the temperature increased at the rate of 40° F. per hour. The heat distortion temperature was taken to be the temperature at which the sample elongated 0.5 inches (ca. 30% elongation assuming all of the elongation takes place in the narrowest section of the tensile bar). Zero elongations was measured at room temperature with the load on the sample.

The service temperature of the mechanically mixed adhesives was measured by using a shear adhesion failure test (SAFT). This test consisted of finding the temperature at which a 1 × 1 inch lap shear joint failed with a 1 kilogram load. The lap shear joints were prepared by compression molding at 160° C. the adhesive formulation between two sheets of 1 mil mylar with a 1.5 mil aluminum foil shim. The shim regulated the adhesive thickness (usually 2-3 ml) and also masked the appropriate area for the 1 inch square lap joint. The excess mylar was trimmed away and the aluminum foil removed to leave the appropriate size specimen. The lap shear joint with a 1 kg load was placed in an oven in which the temperature was increased at the rate of 40° F./hr. The SAFT temperature was taken to be the temperature at which the joint failed.

Illustrative Embodiment I

Illustrative Embodiment I reveals the improved high service temperatures of adhesive compositions containing the low molecular weight polyphenylene ether resin. The adhesives were prepared by first mixing all components (except the mid-block tackifying resin) in a Banbury mixer, at 200° C. followed by extrusion at 250° C. The chopped pellets were then mixed with the mid-block resin in a Sigma Blade Brabender mixer at 180° C. The results shown in Table I indicate the dramatic improvement in SAFT when PPO-L is employed in the compositions. All of the adhesive blends were transparent except 7 and 12 (blends with PPO-H). It should be noted that PPO-H does not improve the service temperature of the adhesive.

TABLE I

| Run No. | 1 | 2 | 3 | 4 | 5 | 6 | 7 | 8 | 9 | 10 | 11 | 12 |
|---|---|---|---|---|---|---|---|---|---|---|---|---|
| Block Copolymer I | 100 | 100 | 100 | 100 | 100 | 100 | 100 | 100 | 100 | 100 | 100 | 100 |
| TUFFLO 6056 | | | | 50 | 50 | 50 | 50 | 50 | 50 | 50 | 50 | 50 |
| KAYDOL | 100 | 100 | 100 | | | | | | | | | |
| WINGTACK 95 | | | | | | | | | 150 | 150 | 150 | 150 |

TABLE I-continued

| Run No. | 1 | 2 | 3 | 4 | 5 | 6 | 7 | 8 | 9 | 10 | 11 | 12 |
|---|---|---|---|---|---|---|---|---|---|---|---|---|
| ARKON P-85 | 200 | 200 | 200 | 150 | 150 | 150 |  | 150 |  |  |  |  |
| PPO-H |  |  |  |  |  |  | 20 |  |  |  |  | 20 |
| PPO-L |  | 20 |  |  | 10 | 20 |  |  |  | 20 |  |  |
| LX-509 |  |  | 20 |  |  |  |  | 20 |  |  | 20 |  |
| IRGANOX 1010 | 2 | 2 | 2 | 1 | 1 | 1 | 1 | 1 | 1 | 1 | 1 | 1 |
| SAFT (° F) | 195 | 218 | 196 | 232 | 255 | 278 | 235 | 230 | 241 | 270 | 252 | 235 |

Illustrative Embodiment II

Illustrative Embodiment II reveals the significant improvement in heat distortion temperature for blends containing PPO-L. The various blends were prepared by mixing the components on a Brabender mixer at a temperature of about 250° C. for 8 min. at 50 rpm. The results are presented below in Table II. All blends were transparent.

TABLE II

| Run No. | 13 | 14 | 15 | 16 | 17 | 18 | 19 | 20 |
|---|---|---|---|---|---|---|---|---|
| Block Copolymer I | 100 | 100 | 100 | 100 | 100 | 100 | 100 | 100 |
| KAYDOL | 100 | 100 | 100 |  |  |  | 100 | 100 |
| TUFFLO 6056 |  |  |  | 100 | 100 | 100 |  |  |
| PPO-L |  | 20 | 50 |  | 20 | 50 |  |  |
| LX-509 |  |  |  |  |  |  | 20 | 50 |
| IRGANOX 1010 | 1 | 1 | 1 | 1 | 1 | 1 | 1 | 1 |
| HDT (° F.) | 139 | 175 | 217 | 140 | 178 | 215 | 156 | 182 |
| ΔHDT (° F.) |  | 36 | 78 |  | 38 | 75 | 17 | 43 |

Illustrative Embodiment III

In Illustrative Embodiment III, various blends of the present block copolymer and PPO-L were prepared by melt blending at 250° C. on a Brabender mixer for 8 min. at 50 rpm. All samples contained 0.5 phr dilaurylthiodipropionate and 0.5 phr IRGANOX 1010. As is evident from the results shown in Table III, the heat distortion temperature was raised significantly (up to 100° F.). All of the blends were transparent.

TABLE III

| Run No. | 21 | 22 | 23 | 24 | 25 |
|---|---|---|---|---|---|
| Block Copolymer II | 100 | 100 | 100 | 100 | 100 |
| PPO-L | — | 5 | 12 | 35 | 17.5 |
| LX-509 | — | — | — | — | 17.5 |
| HDT, ° F. | 165 | 189 | 220 | 265 | 250 |
| ΔHDT, ° F. | — | 24 | 55 | 100 | 85 |

What is claimed is:

1. A hot melt adhesive composition comprising:
   (a) 100 parts by weight of a block copolymer having at least two polymer end blocks A and at least one polymer mid block B, each block A being a monoalkenyl arene polymer block having an average molecular weight of between about 2,000 and about 50,000, and each block B being an elastomeric hydrogenated polymer block of a conjugated diene, having an average molecular weight of between about 20,000 and about 300,000, said blocks A comprising 8–55% by weight of the block copolymer;
   (b) about 50 to about 200 parts by weight of a tackifying resin compatible with block B;
   (c) about 0 to about 200 parts by weight of a hydrocarbon extending oil; and
   (d) about 1 to about 100 parts by weight of a low molecular weight polyphenylene ether resin having a molecular weight ($M_{vis}$) of between about 6,000 and about 25,000 and a glass transition temperature of between 170° C. and 200° C.

2. A composition according to claim 1 wherein the various components are melt blended at a temperature of between about 230° C. and about 260° C.

3. A composition according to claim 1 wherein the polyphenylene ether resin is poly (2,6-dimethyl-1,4-phenylene) ether.

4. A composition according to claim 1 wherein the monoalkenyl arene is styrene and the conjugated diene is selected from the group consisting of isoprene and butadiene.

5. A composition according to claim 4 wherein the number average molecular weight of the styrene blocks is between about 8,000 and about 35,000, and the number average molecular weight of the conjugated diene blocks is between about 25,000 and about 150,000.

6. A composition according to claim 4 wherein the block copolymer has the structure A-B(B-A)$_n$, where n varies from 1 to 20.

7. A composition according to claim 1 wherein the amount of component d) is between about 5 and about 50 parts by weight.

8. A composition according to claim 1 including between about 0 and about 200 parts by weight of a high softening point resin compatible with block A, said high softening point resin being selected from the group consisting of coumarone-indene resins, vinyl toluene-alphamethylstyrene copolymers and polyindene resins.

9. A composition according to claim 1 wherein the amount of hydrocarbon extending oil is between about 25 and about 150 parts by weight.

* * * * *